US012633859B2

(12) United States Patent
May et al.

(10) Patent No.: US 12,633,859 B2
(45) Date of Patent: May 19, 2026

(54) PORTABLE VARIABLE FREQUENCY DRIVE

(71) Applicant: BOARD OF REGENTS, THE UNIVERSITY OF TEXAS SYSTEM, Austin, TX (US)

(72) Inventors: Matthew Peter May, San Antonio, TX (US); John A. Saldana, Puyallup, WA (US); Brent Carlton Tyroff, Boerne, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 294 days.

(21) Appl. No.: 16/043,119

(22) Filed: Jul. 23, 2018

(65) Prior Publication Data

US 2024/0421743 A1 Dec. 19, 2024

Related U.S. Application Data

(60) Provisional application No. 62/623,161, filed on Jan. 29, 2018, provisional application No. 62/535,825, filed on Jul. 22, 2017.

(51) Int. Cl.
*H02P 27/08* (2006.01)
*H02P 27/04* (2016.01)

(52) U.S. Cl.
CPC ............ *H02P 27/08* (2013.01); *H02P 27/045* (2013.01)

(58) Field of Classification Search
CPC .......... H02P 27/04; H02P 27/06; H02P 27/08; H02P 1/42; H02P 1/46; H02P 1/26; H02P 25/03; H02P 25/145; H02P 23/07; H02P 6/08; H02P 23/00; H02P 25/062; H02P 25/02; F25B 2600/0253; F24F 2221/12
See application file for complete search history.

(56) References Cited

U.S. PATENT DOCUMENTS

2014/0265946 A1* 9/2014 Bartlik ................... H02P 27/04
318/808
2017/0188482 A1* 6/2017 Stockdale ............ H05K 7/2039

* cited by examiner

*Primary Examiner* — Antony M Paul

(57) ABSTRACT

Disclosed herein is a variable frequency drive. More specifically, the present invention generally relates to a device and method of use for a portable variable frequency drive to provide a portable means for expeditiously restoring operation to critical equipment resulting from variable speed motor controller (VFD) failures.

3 Claims, 10 Drawing Sheets

310

310

310

PORTABLE VARIABLE FREQUENCY DRIVE

CROSS-REFERENCE TO RELATED APPLICATIONS

This application claims the benefit under Title 35 United States Code§ 1 19(e) of U.S. Provisional Patent Application Ser. No. 62/535,825; Filed: Jul. 22, 2017, and of U.S. Provisional Patent Application Ser. No. 62/623,161; Filed: Jan. 29, 2018, the full disclosure of which is incorporated herein by reference.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATING-BY-REFERENCE OF MATERIAL SUBMITTED ON A COMPACT DISC

Not applicable

SEQUENCE LISTING

Not applicable

FIELD OF THE INVENTION

The present invention generally relates to a device and method of use for variable frequency drives. More specifically, the present invention generally relates to a device and method of use for a portable variable frequency drive.

BACKGROUND OF THE INVENTION

Without limiting the scope of the disclosed device, the background is described in connection with a novel device and method of use for a portable variable frequency drive.

To help alleviate these issues, several approaches in the prior art have been taken to restoring operation to equipment resulting from a variable speed motor controller (VFD) failure. The current state of the art utilizes an approach of ordering a replacement VFD. The cost of multiple units of different sizes certainly represents a substantial cost. When a failure occurs, the time it would take to uncrate a particular unit and assemble the necessary connection hardware would take considerable time. Often times these units are heavy and hard to handle out of the box.

While all of the aforementioned devices may fulfill their unique purposes, none of them fulfill the need for a practical, effective, and efficient means for a portable variable frequency drive.

Therefore, the present invention proposes a novel device and method of use for a variable frequency drive.

BRIEF SUMMARY OF THE INVENTION

The present invention, therefore, provides for a device and method of use for a variable frequency drive. More specifically, the present invention generally relates to a device and method of use for a portable variable frequency drive. In one embodiment the device is comprised of the part listed in the VFD parts list of the appendix.

In summary, the present invention discloses a novel device and method of use for a portable variable frequency drive.

BRIEF DESCRIPTION OF THE SEVERAL VIEWS OF THE DRAWINGS

For a more complete understanding of the features and advantages of the present invention, reference is now made to the detailed description of the invention along with the accompanying figures in which.

DETAILED DESCRIPTION OF THE INVENTION

Disclosed herein is an improved device and method of use for a portable variable frequency drive. The numerous innovative teachings of the present invention will be described with particular reference to several embodiments (by way of example, and not of limitation).

Figure 1:
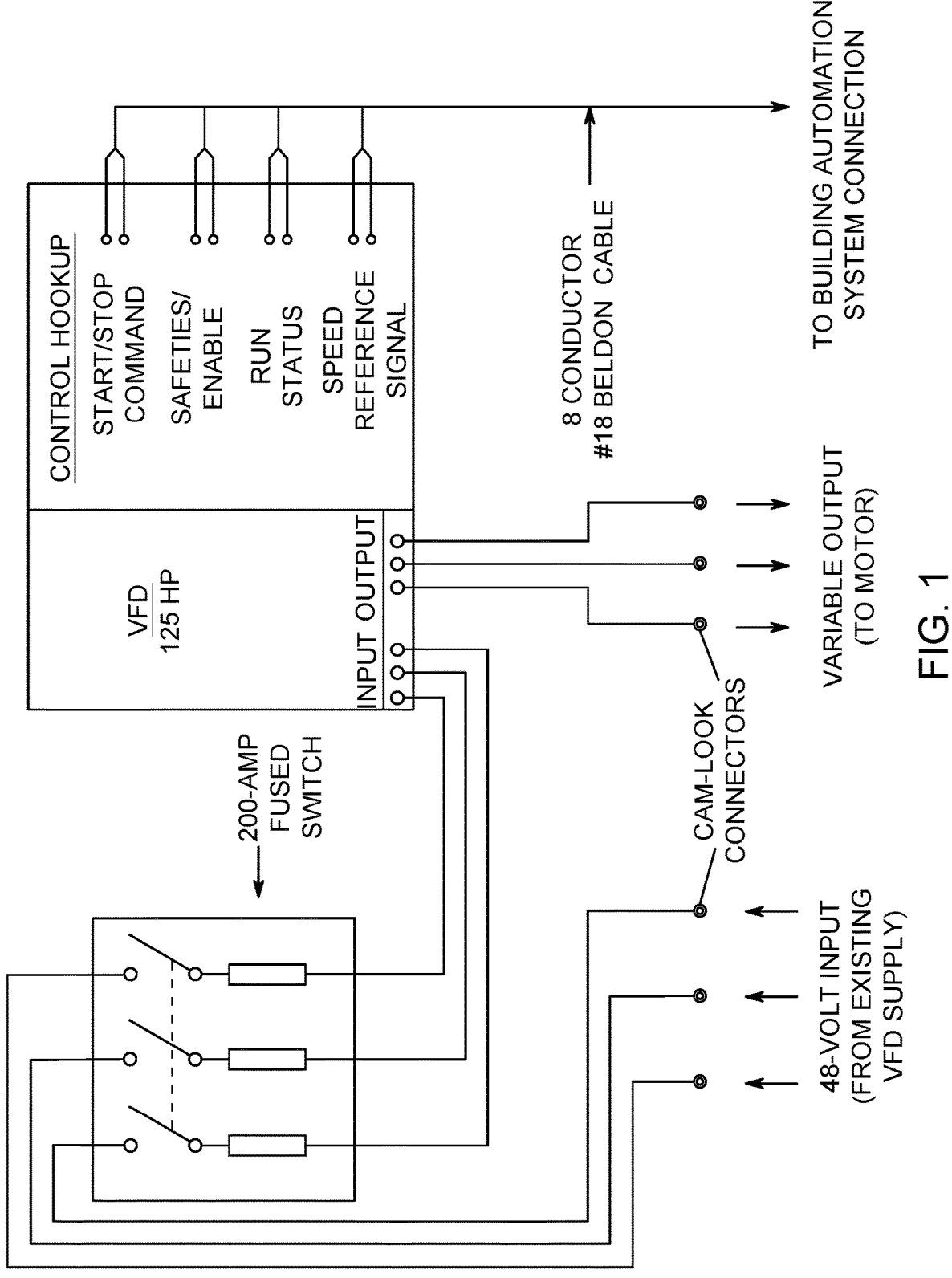
FIG. 1 is a wiring diagram of the portable frequency drive in accordance with embodiments of the disclosure.

Reference is first made to FIG. 1, a wiring diagram of the portable frequency drive in accordance with embodiments of the disclosure. The diagram illustrating the connection between the control hookup and the building automation system connection.

Figures 2A, 2B, 2C:
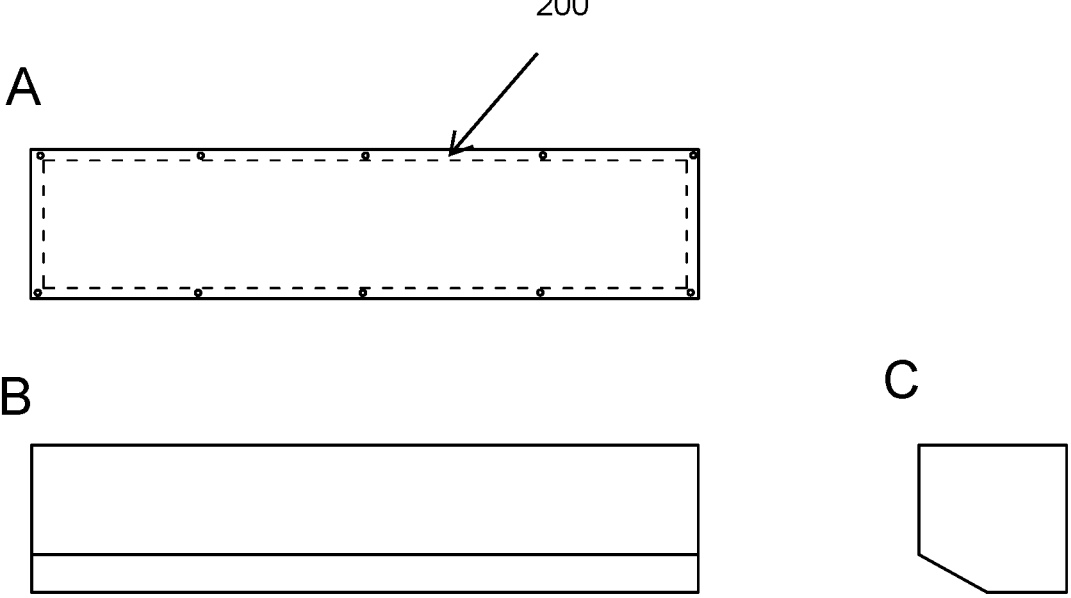
FIG. 2A-2C is a top (A), side (B), and end (C) view of the wiring gutter 200 in accordance with embodiments of the disclosure.

Reference is next made to FIG. 2A-2C, a top (A), side (B), and end (C) view of the wiring gutter 200 of the variable frequency drive in accordance with embodiments of the disclosure.

Figure 3:
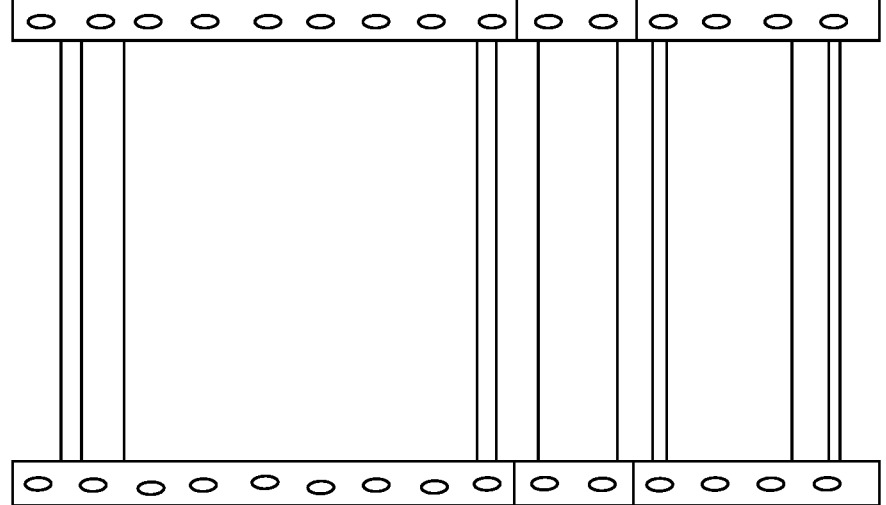
FIG. 3 is a top view of the support frame 310 of the portable frequency drive in accordance with embodiments of the disclosure.

Reference is now made to FIG. 3, a top view of the support frame 310 of the portable frequency drive in accordance with embodiments of the disclosure.

Figure 4:
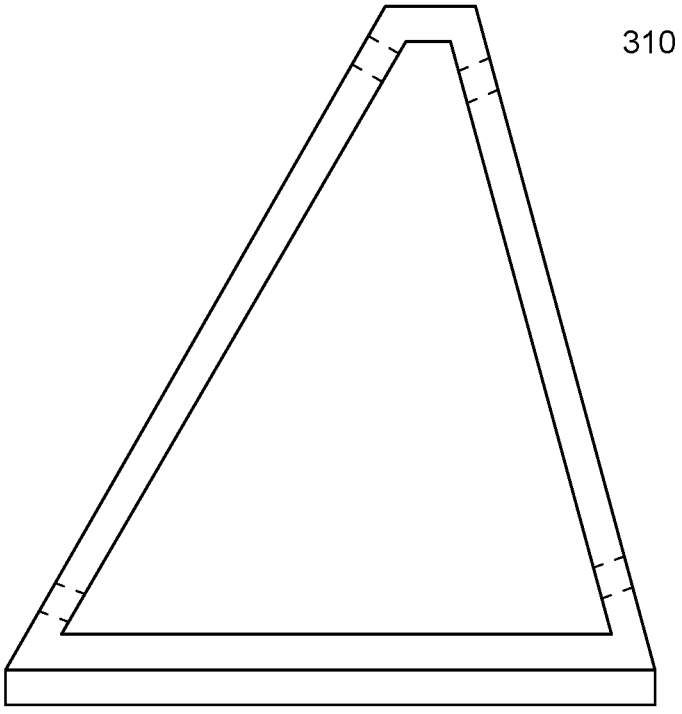
FIG. 4 is a side view of the support frame 310 of the portable frequency drive in accordance with embodiments of the disclosure.

Reference is next made to FIG. 4, a side view of the support frame 310 of the portable frequency drive in accordance with embodiments of the disclosure.

Figure 5:
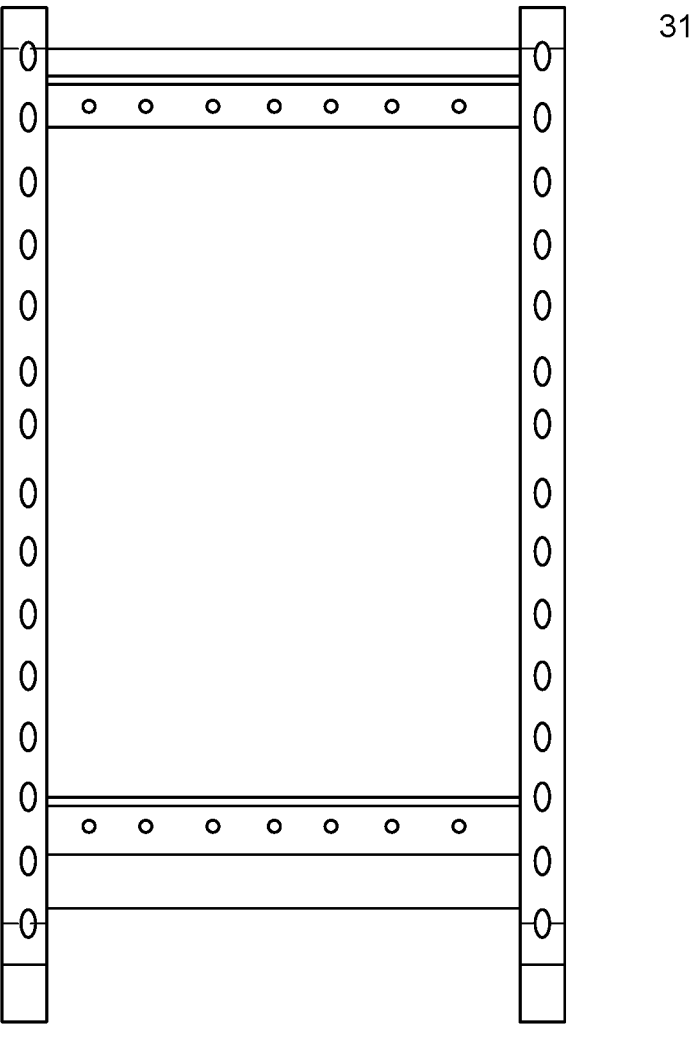
FIG. 5 is a back view of the support frame 310 of the portable frequency drive in accordance with embodiments of the disclosure.

Reference is now made to FIG. 5, a back view of the support frame 310 of the portable frequency drive in accordance with embodiments of the disclosure.

Figure 6:
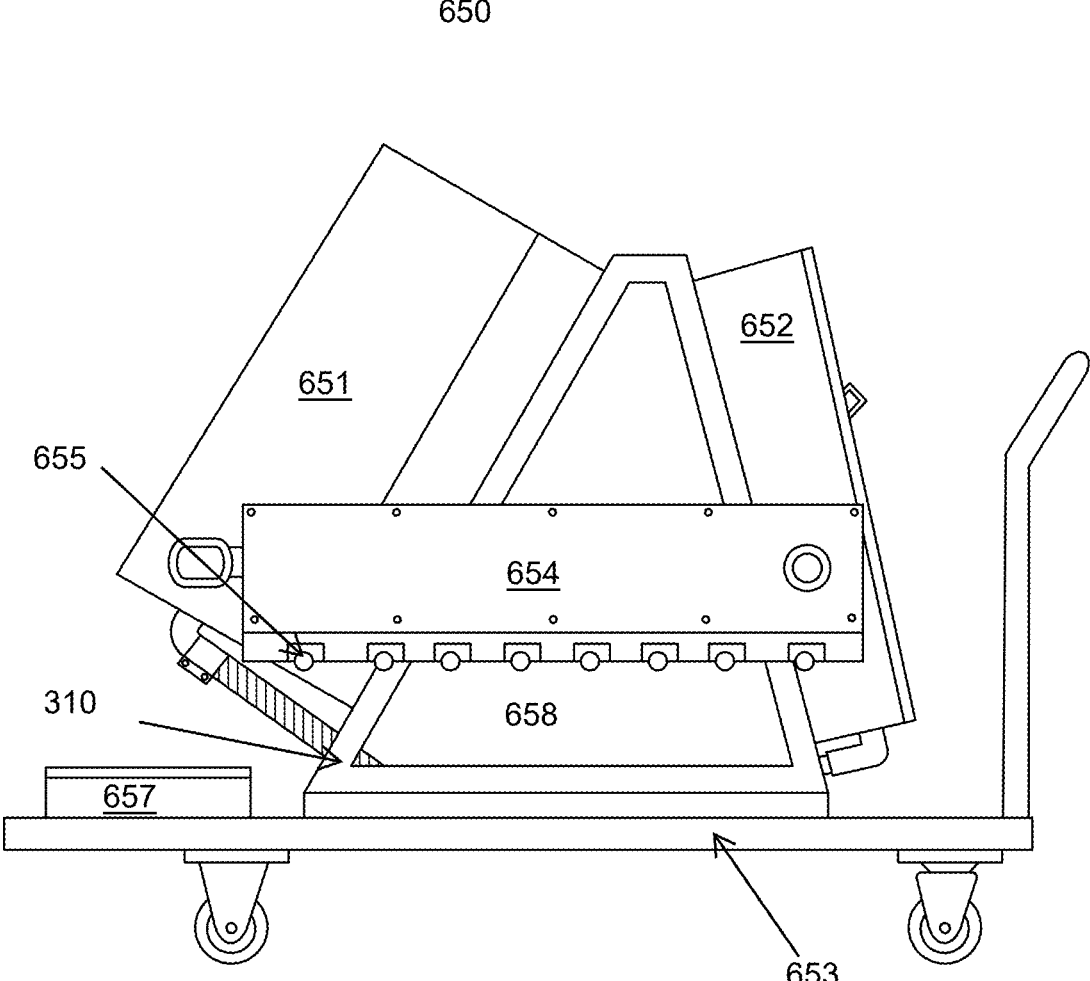
FIG. 6 is a side view of the portable frequency drive in accordance with embodiments of the disclosure.

Reference is next made to FIG. 6, a side view of the portable frequency drive 650 in accordance with embodiments of the disclosure. The invention combines a variable speed motor control 651 with a safety disconnecting switch 652, four-wheeled platform cart 653, and quick connect power cabling 654. On-board power wiring is routed from the input connections 655 via a metallic wire way to the safety isolation switch 652. This disconnecting switch 652 connected to the supply side of the variable speed motor controller 651. Wiring is then routed from the load side of the VFD 650 to the unit output power quick connectors 655. Cam-lock quick connectors greatly reduce the time it takes to roll out power cabling to a failed unit with less likelihood of tangling or kinking permanently connected wiring. The connectors also limit the time it takes to check and change output phased sequencing (which affects motor rotational direction) to seconds. A single, eight conductor jacketed cable is permanently connected to the VFD control terminals 651 and is simply rolled out and connected to the failed unit's signal wiring. Relays are utilized to accommodate different control voltages. The frame structure 310 provides a space 658 for neatly storing cables when they are not in use. A small storage compartment 657 is provided for an assortment of power connectors used to existing power supply and motor cabling.

Figure 7:
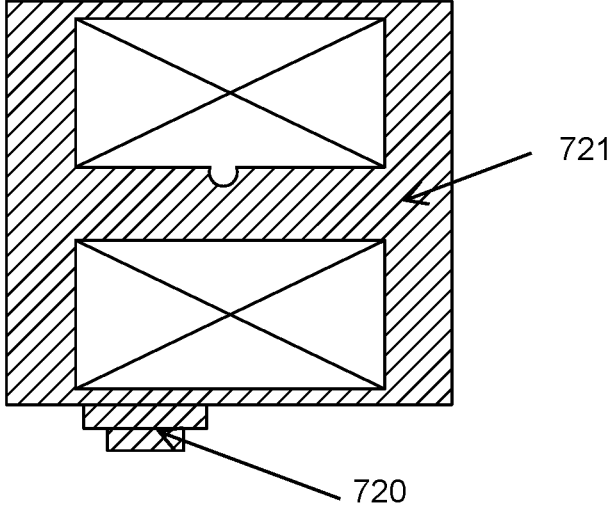
FIG. 7 is an embodiment illustrating the switch 720 and terminal enclosure 721 of the portable frequency drive in accordance with embodiments of the disclosure.
Figure 7:
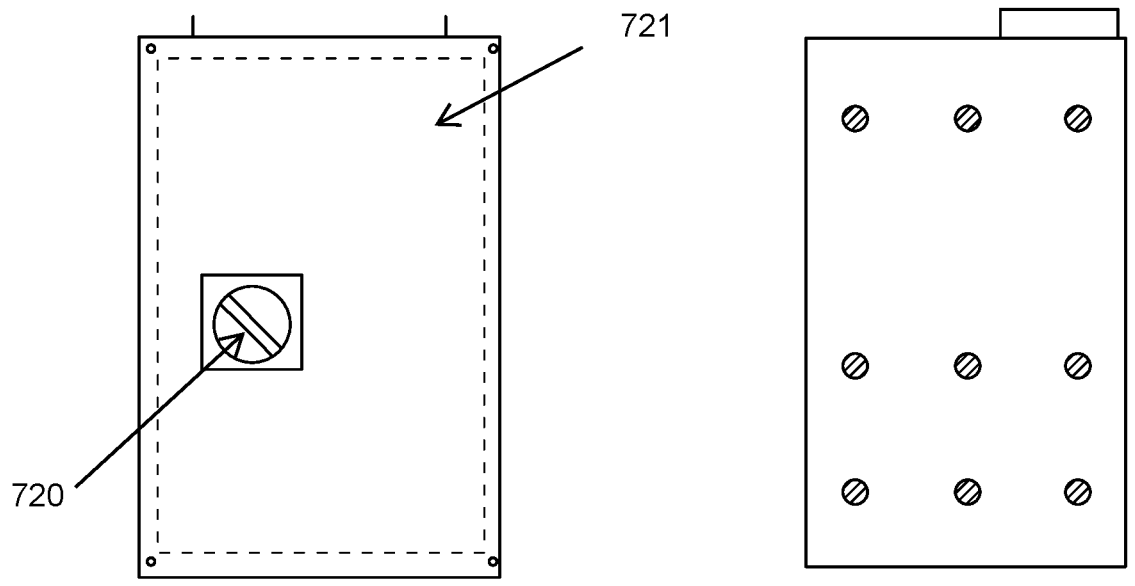

Reference is now made to FIG. 7 an embodiment illustrating the switch 720 and terminal enclosure 721 of the portable frequency drive in accordance with embodiments of the disclosure. In this illustration the operator for internal main circuit breaker is depicted. In this embodiment covered by FIGS. 7-10, a more compact main disconnect switch and cam-lock receptacles are condensed into one box at the base of the VFD, all cables are receptacle connected, cables are labeled with indicia and/or color coded, and cam-lock receptacles are male and female to distinguish between line and motor connections.

Figure 8:
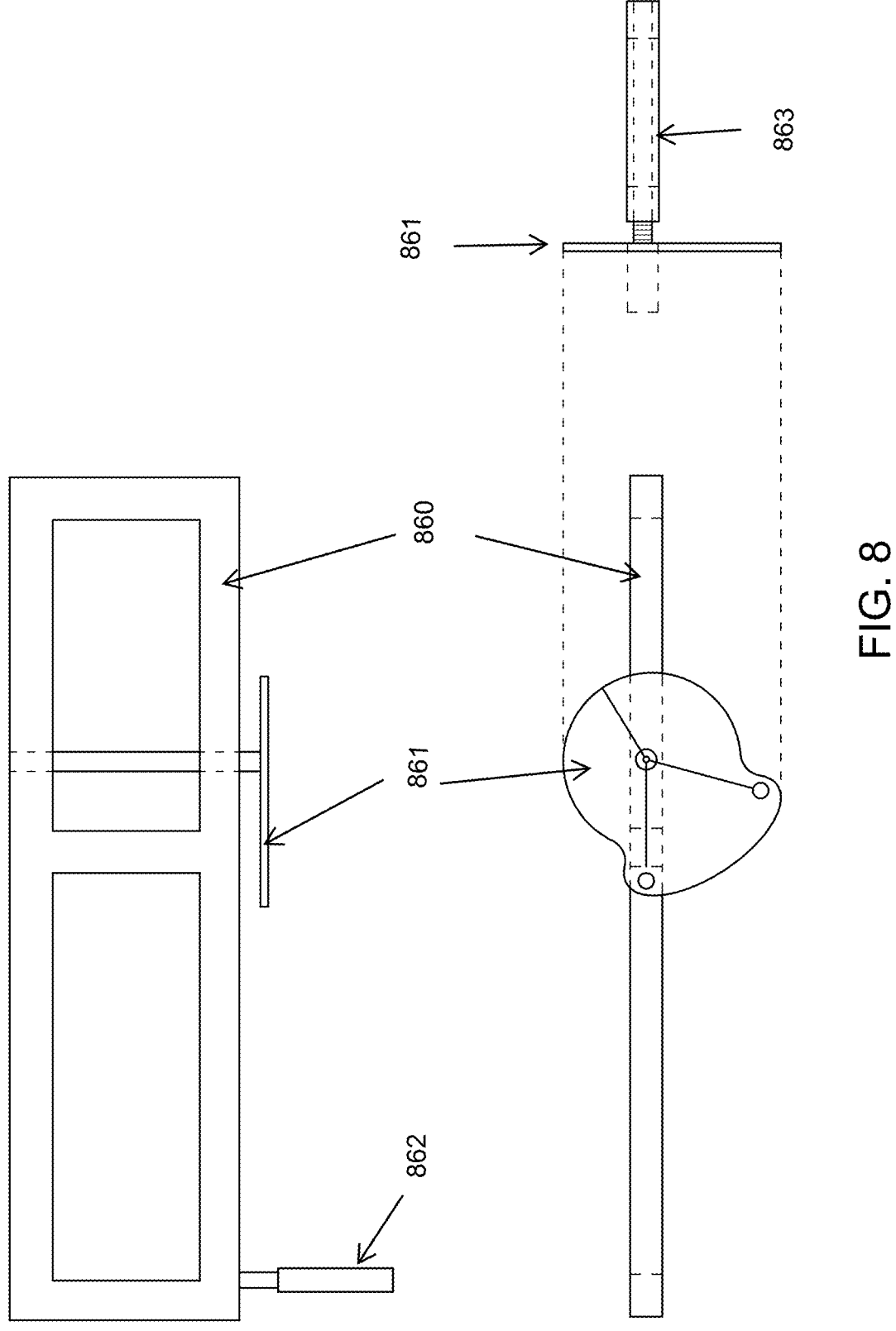
FIG. 8 is an embodiment illustrating the component pivoting frame of the portable frequency drive in accordance with embodiments of the disclosure.

Reference is next made to FIG. 8 an embodiment illustrating the component pivoting frame 860 of the portable frequency drive in accordance with embodiments of the disclosure. Pivoting frame 860 comprising a pivot plate 861 with a locking pin 863, and handle 862 In this embodiment the component pivoting frame is more streamlined and more compact than the previous embodiment disclosed. The smaller component pivoting frame is smaller giving it a reduced footprint. A tilt feature is embodied enabling a lower profile for easier storage and transportation.

Figure 9:
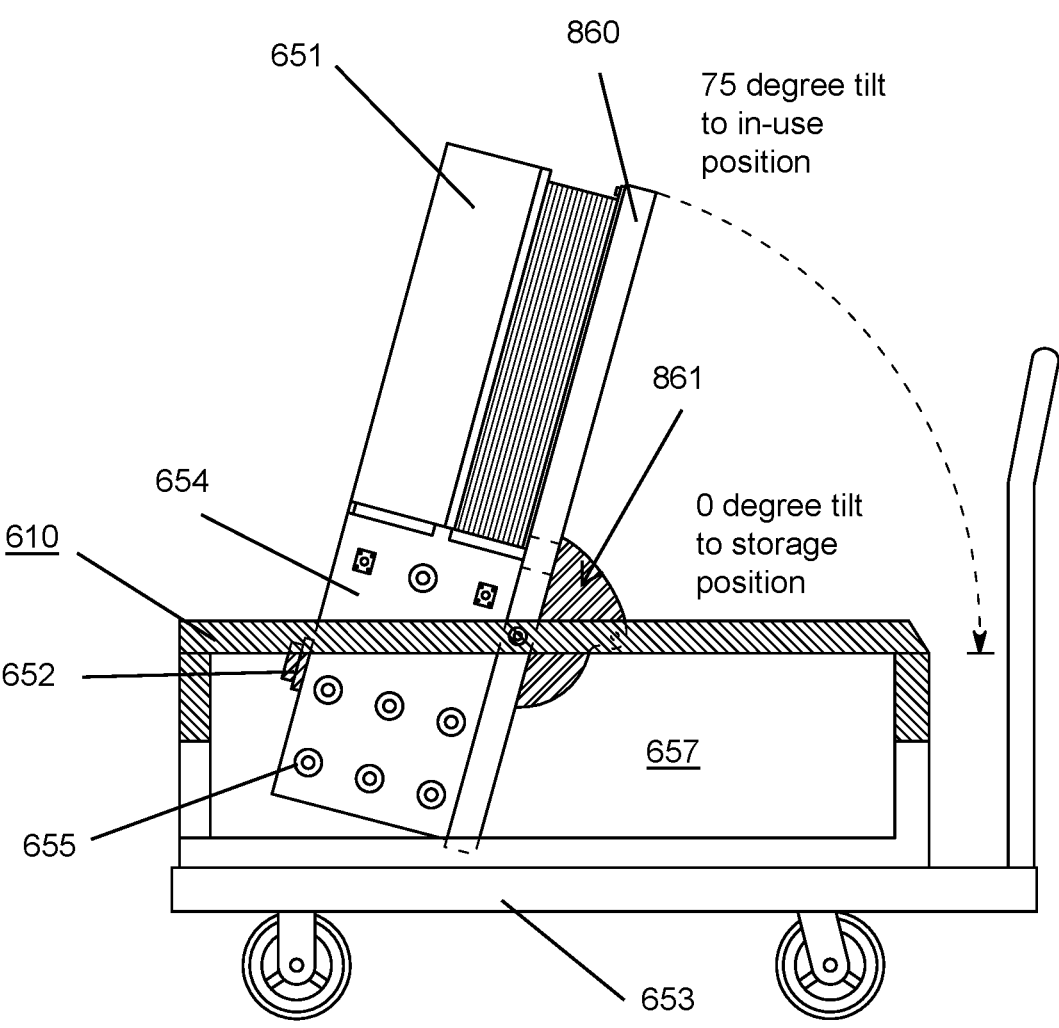
FIG. 9 is a side view embodiment of the portable frequency drive illustrating the pivot capabilities allowing transport/storage and in-use configurations in accordance with embodiments of the disclosure.

Reference is now made to FIG. 9 a side view embodiment of the portable frequency drive 650 illustrating the pivot capabilities allowing transport/storage and in-use configurations in accordance with embodiments of the disclosure. When the device is in-use the in-use configuration is used allowing the VFD 650 to tilt vertically to a 75 degree angle which allows the electrician to more easily view the on-board display while programming and operating the unit. The safety disconnect switch 652 and cam-lok receptacle(s) 655 wiring gutter were incorporated into a single, smaller, custom-made enclosure mounted under the VFD. This setup decreased the number of enclosures from three to two and significantly reduced unit cost. This is a variation from the previous embodiment where the wiring gutter containing the cam-lok receptacles has been eliminated. Also a variation from the previous embodiment is the frame mounted 200 amp safety disconnect was replaced with a circuit breaker installed inside the enclosure.

In the embodiment captured in FIGS. 7-10, all power and control cables are receptacle connected and labeling/identification is more enhanced. Cam-lok receptacles were changed from color coded female receptacles to color-coded male receptacle for the line voltage conductors and color-coded female receptacles for the motor conductors. An 8-pin Amphenol receptacle is configured within the VFD for the connection of control wires (start signal, safety inputs, and status wires). An additional 3-pin Amphenol receptacle was installed for the connection of the speed reference signal. Power cables are labeled on each end with indicia to insure correct connections. Power and control receptacles are durable marked according to their function.

Figure 10:
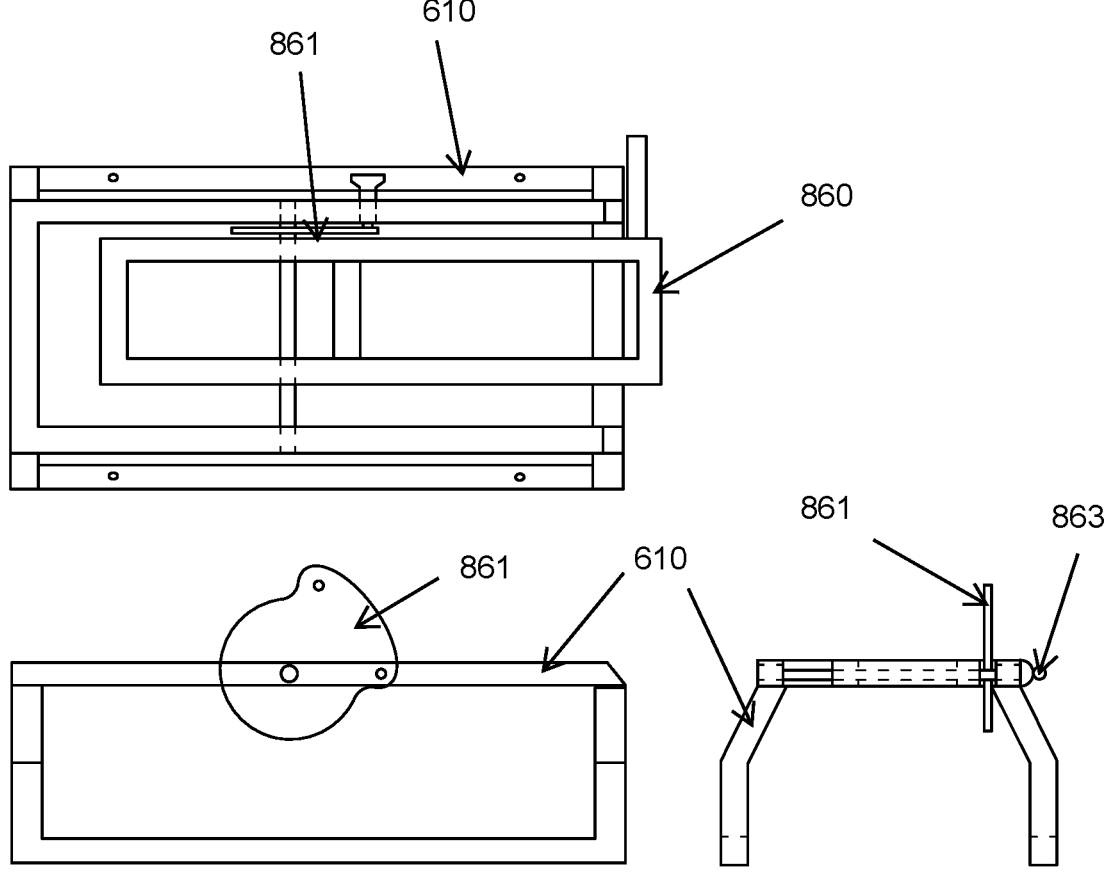
FIG. 10 are the schematics for the main support frame of the portable frequency drive in accordance with embodiments of the disclosure.

Reference is lastly made to FIG. 10 schematics for the main support frame of the portable frequency drive in accordance with embodiments of the disclosure.

In brief, the invention is directed to a device and method of use for a variable frequency drive.

The disclosed device and method of use is generally described, with examples incorporated as particular embodiments of the invention and to demonstrate the practice and advantages thereof. It is understood that the examples are given by way of illustration and are not intended to limit the specification or the claims in any manner.

To facilitate the understanding of this invention, a number of terms may be defined below. Terms defined herein have meanings as commonly understood by a person of ordinary skill in the areas relevant to the present invention. Terms such as "a", "an", and "the" are not intended to refer to only a singular entity, but include the general class of which a specific example may be used for illustration. The terminology herein is used to describe specific embodiments of the invention, but their usage does not delimit the disclosed device or method of use, except as may be outlined in the claims.

Alternative applications for this invention include using this device or method of use in any application where a variable speed motor controller (VFD) failure takes place. Consequently, any embodiments comprising a one piece or multi piece device having the structures as herein disclosed with similar function shall fall into the coverage of claims of the present invention and shall lack the novelty and inventive step criteria.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific device and method of use described herein. Such equivalents are considered to be within the scope of this invention and are covered by the claims.

All publications and patent applications mentioned in the specification are indicative of the level of those skilled in the art to which this invention pertains. All publications and patent application are herein incorporated by reference to the same extent as if each individual publication or patent application was specifically and individually indicated to be incorporated by reference.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases.

The device and/or methods of use disclosed and claimed herein can be made and executed without undue experimentation in light of the present disclosure. While the device and methods of use of this invention have been described in terms of preferred embodiments, it will be apparent to those skilled in the art that variations may be applied to the device and/or methods of use and in the steps or in the sequence of steps of the method of use described herein without departing from the concept, spirit, and scope of the invention.

More specifically, it will be apparent that certain components, which are both shape and material related, may be substituted for the components described herein while the same or similar results would be achieved. All such similar substitutes and modifications apparent to those skilled in the art are deemed to be within the spirit, scope, and concept of the invention as defined by the appended claims.

What is claimed is:

1. A device for a portable variable frequency drive as disclosed comprising a support frame coupled to a supplemental variable frequency drive (VFD), the supplemental VFD having disconnecting/connecting (power) means, building automation connections, and power input/output connectors; the portable VFD configured so that the supplemental variable frequency drive can be moved to a location of need and provide temporary VFD function.

2. The device of claim 1, wherein the support frame is positioned on a wheeled platform.

3. The device of claim 1, wherein coupled to the support frame and configured to be in a storage position that is parallel to the support platform horizontal plane or an in-use position, wherein the pivot frame is operatively coupled to the variable frequency drive and to the support platform that is at most a 75 degree tilt relative to the support platform horizontal plane.

* * * * *